United States Patent
Park et al.

(10) Patent No.: US 7,773,157 B2
(45) Date of Patent: Aug. 10, 2010

(54) DIGITAL VIDEO SIGNAL PROCESSING APPARATUS AND METHOD FOR ADAPTIVE Y/C SEPARATION

(75) Inventors: Sung-Cheol Park, Seoul (KR);
Hyung-Jun Lim, Suwon-si (KR);
Jae-Hong Park, Seognam-si (KR);
Kyoung-Mook Lim, Hwaseong-si (KR);
Heo-Jin Byeon, Hwaseong-si (KR);
Eui-Jin Kwon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1246 days.

(21) Appl. No.: 11/332,839

(22) Filed: Jan. 13, 2006

(65) Prior Publication Data

US 2006/0170826 A1 Aug. 3, 2006

(30) Foreign Application Priority Data

Jan. 13, 2005 (KR) .................... 10-2005-0003176

(51) Int. Cl.
*H04N 9/77* (2006.01)
*H04N 9/78* (2006.01)
*G06K 9/40* (2006.01)

(52) U.S. Cl. ................. 348/663; 348/665; 348/667; 348/669; 382/261

(58) Field of Classification Search ............... 348/663, 348/664, 665, 667, 669, 670; 382/261
See application file for complete search history.

(56) References Cited

U.S. PATENT DOCUMENTS

| | | | |
|---|---|---|---|
| 4,819,061 A | | 4/1989 | Lang |
| 5,818,964 A | * | 10/1998 | Itoh .......................... 382/205 |
| 5,990,978 A | * | 11/1999 | Kim et al. ................... 348/663 |
| 6,236,433 B1 | * | 5/2001 | Acharya et al. ............. 348/273 |
| 6,348,929 B1 | * | 2/2002 | Acharya et al. ............. 345/660 |
| 6,360,002 B2 | * | 3/2002 | Kim et al. .................... 382/103 |
| 6,504,579 B1 | | 1/2003 | Scherrer |
| 6,654,504 B2 | * | 11/2003 | Lubin et al. ................. 382/254 |
| 6,674,488 B1 | * | 1/2004 | Satoh ......................... 348/663 |
| 6,774,954 B1 | * | 8/2004 | Lee ............................. 348/665 |
| 6,795,126 B1 | * | 9/2004 | Lee ............................. 348/663 |
| 6,970,597 B1 | * | 11/2005 | Olding et al. ............... 382/167 |
| 6,999,100 B1 | * | 2/2006 | Leather et al. .............. 345/611 |

(Continued)

FOREIGN PATENT DOCUMENTS

JP 11-004458 6/1999

OTHER PUBLICATIONS

Taiwanese Office Action dated Sep. 3, 2009 in corresponding Taiwanese Appln. No. 095101395.

*Primary Examiner*—Brian P Yenke
(74) *Attorney, Agent, or Firm*—F. Chau & Associates, LLC

(57) ABSTRACT

An adaptive digital video signal processing apparatus and method for Y/C separation. In the video signal processing apparatus, an adaptive 2D BPF carries out Y/C separation through comb filtering and bandpass filtering selected according to local characteristics of an image (e.g., based on the direction in which an edge in the image extends in vertical and horizontal directions. The adaptive 2D BPF performs 2D bandpass filtering in general case. The 2D BPF adaptively executes a series of selections of the various filtering operations in a continuous manner.

31 Claims, 7 Drawing Sheets

U.S. PATENT DOCUMENTS

| | | | |
|---|---|---|---|
| 7,027,661 B2 * | 4/2006 | Estevez et al. | 382/275 |
| 7,315,331 B2 * | 1/2008 | Franzen | 348/452 |
| 7,352,916 B2 * | 4/2008 | Estevez et al. | 382/275 |
| 2002/0031277 A1 * | 3/2002 | Lubin et al. | 382/254 |
| 2004/0091173 A1 * | 5/2004 | Akimoto et al. | 382/300 |
| 2006/0110062 A1 * | 5/2006 | Chiang et al. | 382/260 |

* cited by examiner

FIG. 5
| +u | −v | −u | +v | +u |
|----|----|----|----|----|
| +v | −u | −v | +u | +v |
| −u | +v | +u | −v | −u |
| −v | +u | +v | −u | −v |
| +u | −v | −u | +v | +u |
FIG. 6
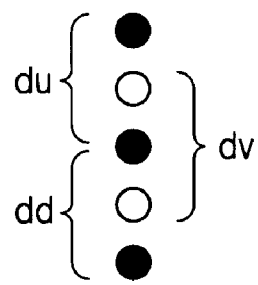
FIG. 7
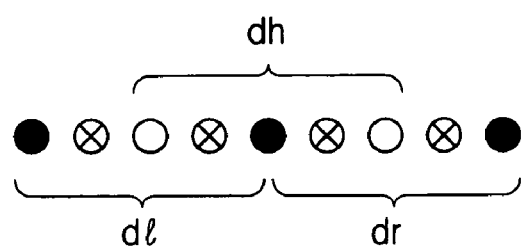

FIG. 11A

| +u | +v | −u | −v | +u | +v | −u |
|----|----|----|----|----|----|----|
| −v | −u | +v | +u | −v | −u | +v |
| −u | −v | +u | +v | −u | −v | +u |

FIG. 11B

| −v | +u | +v | −u | −v | +u | +v |
|----|----|----|----|----|----|----|
| +u | −v | −u | +v | +u | −v | −u |
| +v | −u | −v | +u | +v | −u | −v |

DIGITAL VIDEO SIGNAL PROCESSING APPARATUS AND METHOD FOR ADAPTIVE Y/C SEPARATION

CROSS-REFERENCE TO RELATED PATENT APPLICATION

This application claims priority under 35 U.S.C. §119 of Korean Patent Application No. 10-2005-0003176, filed on Jan. 13, 2005, in the Korean Intellectual Property Office, the disclosure of which is incorporated herein by reference in its entirety.

BACKGROUND OF THE INVENTION

1. Field of the Invention

The present invention relates to a digital video signal processing apparatus, and more particularly, to a digital video signal processing apparatus and method for two-dimensional Y/C separation.

2. Description of the Related Art

The video signal prepared for television (TV) broadcast contains two major parts commingled, the luminance Y (makes a black and white picture in full detail) and chrominance C (coloration with not quite all the detail). This method is used instead of red, green, and blue sub-signals in order to get the best looking picture that can be transmitted in the limited bandwidth of the broadcast channel. Every TV receiver and VCR must contain a filter to separate the luminance and color (Y and C) again. Less than perfect Y/C separators lose resolution—horizontal, vertical, or both. Also there are artifacts such as rainbow swirls where thin stripes should be, and crawling dots where patches of different colors meet.

Thus, the display of a color TV signal transmitted using either the NTSC or PAL standard includes a device for processing a CVBS (Composite Video Blanking Sync) signal which is a composite of a Y (luminance) signal and a C (chrominance) signal. The C signal is quadrature-amplitude-modulated with a predetermined subcarrier frequency and thus the characteristic of the C signal is determined by its frequency and phase characteristics. Accordingly, a digital video signal processing apparatus at a receiving end separates Y and C signals with reference to the characteristic of the C signal and outputs separated Y and C signals (e.g. called S-video).

FIG. 1 is a block diagram of a conventional video signal processing apparatus 100. Referring to FIG. 1, the video signal processing apparatus 100 includes a comb filter 110, a one-dimensional bandpass filter (1D-BPF) 120, a weight determination unit 130, a combiner 140, and a subtracter 150. The comb filter 110 vertically band-pass-filters an input video signal and the 1D-BPF 120 horizontally band-pass-filters the input video signal. The weight determination unit 130 determines weights of the output of the comb filter 110 and the output of the 1D-BPF 120 with reference to vertical/horizontal correlation and the phase of a C signal. The combiner 140 combines the output signals of the comb filter 110 and 1D-BPF 120 using the weights to generate a C signal. The subtracter 150 subtracts the C signal from the input CVBS signal to generate a Y signal.

FIG. 2 is a block diagram of another conventional video signal processing apparatus 200. Referring to FIG. 2, the video signal processing apparatus 200 includes a two-dimensional bandpass filter (2D-BPF) 210, a subtracter 220, and a post-processor 230. The 2D-BPF 210 performs a two-dimensional convolution to extract a C signal. The extracted C signal and a Y signal generated by the subtracter 220 are processed by the post-processor 230. When the 2D-BPF 210 carries out Y/C separation incorrectly, the post-processor 230 compensates the Y/C signal to generate a compensated Y and C signals.

In conventional Y/C separation techniques, Y/C separation is performed based on comb filtering when the edge of a detected image has high vertical correlation but Y/C separation is carried out based on 1D bandpass filtering when the detected edge has high horizontal correlation. As described above, when selecting one of these filtering methods according to a conventional Y/C separation technique, system performance largely depends on a threshold used for edge detection. Thus, Y/C separation can be executed incorrectly or unstably when the filtering method is wrongly selected due to inaccurate edge detection. Conventional techniques that do not select one of the filtering methods but combine the results of the filtering operations can solve this problem to some extent. However, these techniques are based on horizontal or vertical one-dimensional filtering, and thus, artifacts may remain in the generated signal due to the inconstant edge directions.

In other words, in the case where the direction in which the edge of an image extends is not uniform, cross-luma, which occurs when a C component exists in the separated Y signal, resulting in dotted artifacts, and cross-color, which occurs when a Y component exists in the separated C signal, resulting in a rainbow pattern artifact, can appear on a displayed image when Y/C separation is not properly performed by comb filtering or 1D bandpass filtering selected discontinuously.

SUMMARY OF THE INVENTION

Video signal processing apparatuses according to embodiments of the invention are used in both NTSC and PAL systems to adaptively perform a selection among comb filtering, (vertical) bandpass filtering and 2D bandpass filtering in a continuous manner in response to local characteristics of an image. This enables accurate edge detection and stable Y/C separation. Accordingly, artifacts such as cross-luma and cross-color in displayed images can be removed to improve display quality when the video signal processing apparatuses of the invention are applied to display systems. The present invention provides a digital video signal processing apparatus that adaptively carries out comb filtering, 1D bandpass filtering and 2D bandpass filtering on CVBS signals of an NTSC system and a PAL system, which have different subcarrier phases, in a continuous manner according to local characteristics of the CVBS signals, to thereby separate Y and C signals.

The present invention also provides a video signal processing method used for both the NTSC and PAL systems which separates Y and C signals through various continuous filtering methods according to local characteristics of a video signal.

As described in greater detail below, in each of the video signal processing apparatuses 300 (FIG. 3), 1000 (FIG. 10) and 1200 (FIG. 12) according to various embodiments of the invention, the adaptive 2D BPFs 330, 1030 and 1230 carry out comb filtering/1D bandpass filtering in response to local characteristics of an image when the edge direction of the image is fixed in vertical/horizontal directions for Y/C separation but perform 2D bandpass filtering in general cases. The 2D BPFs adaptively execute a combination of the various filtering operations in a continuous manner.

According to an aspect of the present invention, there is provided a video signal processing apparatus including a memory, a weight determination unit, and a filter. The memory stores digital data corresponding to a plurality of horizontal scan lines of an input video signal. The weight determination unit generates first plurality of weight coefficients using the stored digital data. The filter outputs a C signal of the input video signal by convolving a horizontal/vertical coefficient mask composed of the first plurality of weight coefficients and a corresponding data window of the stored digital data. The filter adaptively carries out comb filtering, 1D bandpass filtering and 2D bandpass filtering in a continuous manner according to local characteristics of the input video signal. The filter carries out comb filtering when the local characteristics of the video signal indicate high vertical correlation, 1D bandpass filtering when the local characteristics of the video signal indicate high horizontal correlation, and 2D bandpass filtering when the local characteristics of the video signal indicate high or low correlation in both the horizontal and vertical directions.

In an NTSC mode, the coefficient mask corresponds to the data window including data of pixels disposed vertically and horizontally from a central pixel, the data having C component phases opposite to the phase of the central pixel, and data of pixels disposed diagonally from the central pixel, the data having C component phases the same as the phase of the central pixel, the pixels being disposed in a sequential (vertically adjacent) plurality of the horizontal scan lines of the input video signal.

In a PAL mode, the coefficient mask corresponds to the data window including data of pixels disposed vertically and horizontally from a central pixel, the data having C component phases opposite to the phase of the central pixel, and data of pixels disposed diagonally from the central pixel, the data having C component phases the same as the phase of the central pixel, the pixels being disposed in every second of sequential plurality of horizontal scan lines of the input video signal, including the horizontal scan line containing the central pixel.

In the NTSC mode, the weight determination unit further generates second plurality of weight coefficients using the stored digital data, and the filter convolves the first C signal with a diagonal coefficient mask composed of the second plurality of weight coefficients and outputs the convolution result as the C signal of the input video signal.

In the PAL mode, the weight determination unit further generates second plurality of weight coefficients and third plurality of weight coefficients using the stored digital data, and the filter convolves a horizontal/diagonal coefficient mask composed of the second plurality of weight coefficients and a corresponding data window of the stored digital data to generate a second C signal.

Here, the data window corresponds to the horizontal/diagonal coefficient mask and includes data of pixels having phases the same as and opposite to the phase of the central pixel, the pixels being separated from the central pixel in the horizontal/diagonal directions and disposed in a sequential plurality of the horizontal scan lines of the input video signal according to whether the C component phase of the central pixel is 0°/180° or 90°/270°.

According to another aspect of the present invention, there is provided a video signal processing method including: storing digital data corresponding to a plurality of horizontal scan lines of an input video signal; generating first plurality of weight coefficients using the data corresponding to the plurality of horizontal scan lines; and outputting a C signal of the input video signal by convolving a horizontal/vertical coefficient mask composed of the first plurality of weight coefficients with a corresponding data window of the stored digital data as a first C signal. Comb filtering, bandpass filtering and 2D bandpass filtering are adaptively carried out through the convolution in a continuous manner according to local characteristics of the input video signal.

BRIEF DESCRIPTION OF THE DRAWINGS

The above and other features of the present invention will become more apparent by describing in detail exemplary embodiments thereof with reference to the attached drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements, and:

FIG. 5 shows chrominance signal phases of a PAL system;

FIG. 6 is a diagram for explaining a vertical variation in pixels;

FIG. 7 is a diagram for explaining a horizontal variation in pixels;

FIGS. 11A and 11B show diagonal variations in color (chrominance) signal phases of the PAL system.

DETAILED DESCRIPTION OF EMBODIMENTS OF THE INVENTION

Figures 3, 4:
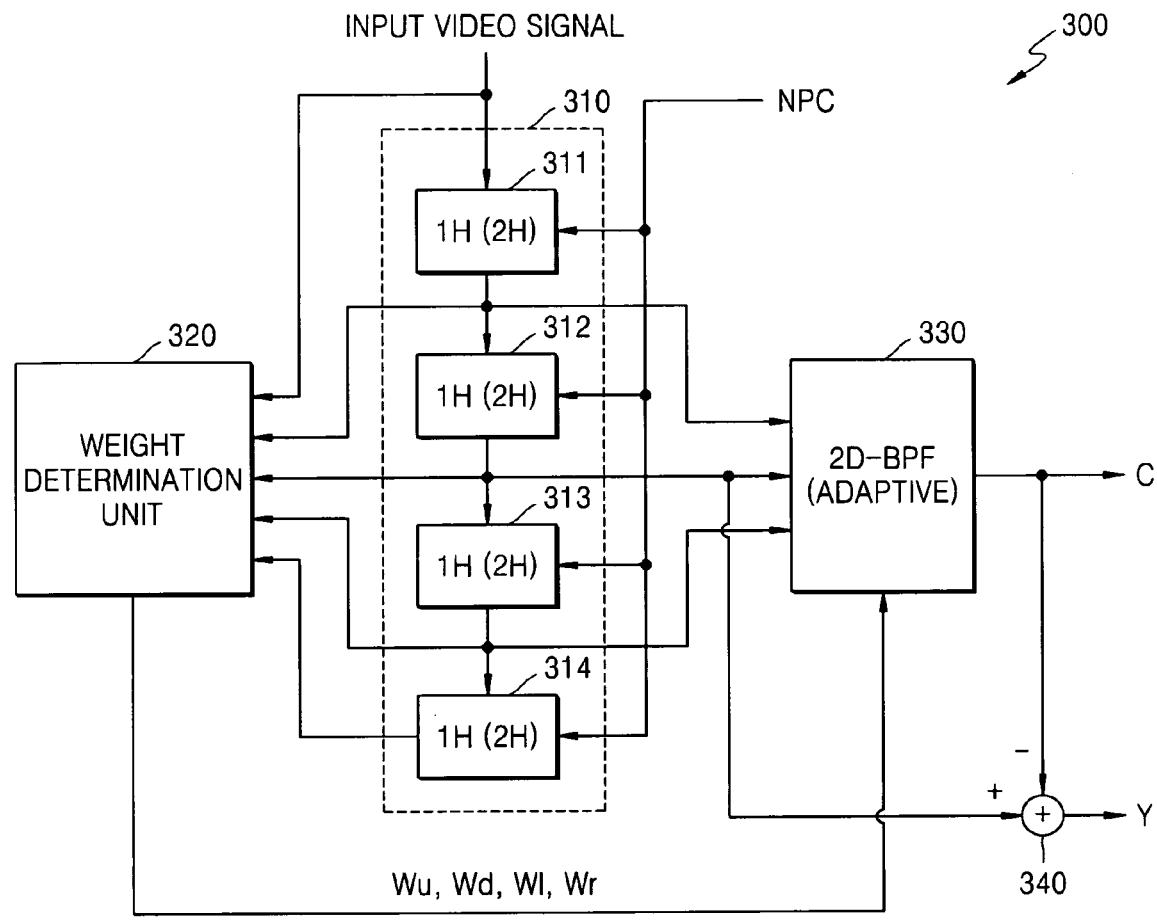
FIG. 3 is a block diagram of a video signal processing apparatus according to an embodiment of the present invention.
FIG. 4 shows chrominance signal phases of an NTSC system.

FIG. 3 is a block diagram of a video signal processing apparatus 300 according to an embodiment of the present invention. Referring to FIG. 3, the video signal processing apparatus 300 includes a memory 310, a weight determination unit 320, a 2D BPF (2-dimensional bandpass filter) 330, and a subtracter 340. The video signal processing apparatus 300 can be used for both an NTSC system (in NTSC mode) and a PAL system (in a PAL mode). The video signal processing apparatus 300 receives a digital CVBS signal as an input video signal and separates Y and C signals. The input video signal can be a digital signal obtained by sampling the active video region of an analog CVBS signal at a predetermined frequency of $4f_{sc}$, where $f_{sc}$ is a subcarrier frequency.

An input video signal (CVBS(t)) of the NTSC system can be represented as follows in equation 1:

$$CVBS(t) = Y + U^* \sin 2\pi f_{SC} t + V^* \cos 2\pi f_{SC} t \qquad \text{[Equation 1]}$$

where U and V are components of the chrominance signal (C), $f_{SC}$ denotes a subcarrier frequency of the chrominance signal, Y represents the luminance signal, and t represents (discrete) time. Thus, in the NTSC system, pixel signals sampled at $4f_{SC}$ have chrominance signal phases as shown in FIG. 4. Thus, the pixel signals are repeated in the form of Y+U, Y+V, Y−U, Y−V, . . . for each horizontal line. FIG. 4 shows only the phases of the chrominance signal components U and V. In the NTSC system, the chrominance signal phases are shifted by 180° in neighbouring (vertically adjacent, above or below) horizontal scan lines, as shown in FIG. 4.

An input video signal (CVBS(t)) of the PAL system can be represented as follows in equation 2:

$$CVBS(t) = Y + U^* \sin 2\pi f_{SC} t \pm V^* \cos 2\pi f_{SC} t \qquad \text{[Equation 2]}$$

where U and V are C components, $f_{SC}$ denotes a subcarrier frequency, Y denotes Luminance, and t represents (discrete) time. In Equation 2, the sign (phase) of the V component alternates between positive and negative. Thus, pixel signals in the PAL system have chrominance signal phases (signs) as shown in FIG. 5. Thus, the pixel signals are repeated in the form of Y+U, Y+V, Y−U, Y−V, . . . or Y+U, Y−V, Y−U, Y+V, . . . in each horizontal line, and the chrominance signal phases are shifted by 180° in every other horizontal scan line.

The Y signal and the C signal (U and V signals) separated and output by the video signal processing apparatus 300 are converted to a format required for an external circuit and stored, or transmitted to a display device. For example, the Y and C signals can be interpolated with three color signals, that is, red (R), green (G) and blue (B) color signals, to be displayed via an LCD (Liquid Crystal display).

The video signal processing apparatus 300 adaptively selects and carries out one of comb filtering and 1D bandpass filtering in response to local characteristics of the input video signal CVBS. For this, the memory 310 stores digital data corresponding to a plurality of horizontal scan lines of the input video signal. The memory 310 includes a plurality of storage (or delay) units 311, 312, 313 and 314, each storing data corresponding to one horizontal scan line. The plurality of storage (delay) units 311, 312, 313 and 314 store either data of sequential horizontal scan lines or data of every other horizontal scan line, based on a control signal NPC. For example, when the control signal NPC has a logic high level, indicating that the NTSC standard is being used (in NTSC mode), the storage units 311, 312, 313 and 314 store data for four sequential (adjacent) horizontal scan lines, which have the chrominance signal phases shown in FIG. 4. When the control signal NPC has a logic low level, indicating that the PAL standard is being used (in PAL mode), the storage units 311, 312, 313 and 314 store data for four of every second (every other) horizontal scan line, which have the chrominance signal phases shown in FIG. 5.

The data corresponding to the plurality of horizontal scan lines stored in the memory 310 and the currently input video data are output to the weight determination unit 320. The weight determination unit 320 generates first "up", "down", "left", and "right" weight coefficients Wu, Wd, Wl and Wr respectively, which will be used by the 2D BPF 330, using the data stored in the memory 310.

The 2D BPF 330 outputs the C signal of the input video signal using the first plurality of weight coefficients Wu, Wd, Wl and Wr. The subtracter 340 subtracts the C signal (U or V signal) generated by the 2D BPF 330 from the video signal CVBS of the currently processed pixel to output the Y signal. For example, when the U signal generated as the C signal is subtracted from the video signal of the current pixel Y+U, the Y signal is obtained.

For both of the NTSC and PAL systems (in NTSC mode and in PAL mode), the 2D BPF 330 adaptively carries out comb filtering, 1D bandpass filtering and 2D bandpass filtering in a continuous manner in response to local characteristics of the input video signal. Thuss, the 2D BPF 330 carries out comb filtering when the local characteristics of the input video signal indicate high vertical correlation and executes 1D bandpass filtering in when the local characteristics of the input video signal indicate high horizontal correlation. Furthermore, the 2D BPF 330 performs 2D bandpass filtering when the local characteristics of the input video signal indicate high or low correlation in both the vertical and horizontal directions.

The 2D BPF 330 uses a filter mask, (e.g., a horizontal/vertical 2-dimensional coefficient mask) composed of a combination of the first plurality of weight coefficients Wu, Wd, Wl and Wr. When the horizontal/vertical coefficient mask is $h_{hv}(i,j)$, the C signal ($C_{hv}(i,j)$) output from the 2D BPF 330 is as follows in equation 3:

$$C_{hv}(i,j) = h_{hv}(i,j) ** CVBS(i,j) \qquad \text{[Equation 3]}$$

Thus, the 2D BPF 330 convolves the horizontal/vertical coefficient mask ($h_{hv}(i,j)$) and a corresponding data window (CVBS(i,j)) stored in the memory 310 to output the C signal ($C_{hv}(i,j)$) of the input video signal. The Y signal (Y(i,j)) output from the subtracter 340 is represented as follows in equation 4:

$$Y(i,j) = CVBS(i,j) - C_{hv}(i,j) \qquad \text{[Equation 4]}$$

For the NTSC system (in NTSC mode), the horizontal/vertical coefficient mask ($h_{hv}(i,j)$) is represented by a 3×5 matrix as follows in equation 5:

$$h_{hv}(i,j) = \begin{bmatrix} Wu \cdot Wl & 0 & 0.5 \cdot Wu & 0 & Wu \cdot Wr \\ 0.5 \cdot Wl & 0 & N & 0 & 0.5 \cdot Wr \\ Wd \cdot Wl & 0 & 0.5 \cdot Wd & 0 & Wd \cdot Wr \end{bmatrix} \qquad \text{[Equation 5]}$$

In Equation 5, N can be a normalizing value that ensures that the sum of the absolute value of N and the absolute values of the weight coefficients used for filtering is 1. The data window CVBS(i,j) used for the convolution represented by Equation 3 performed in the 2D BPF 330, is data corresponding to the data of the 3×5 matrix of Equation 5. In particular, pixel data corresponding to non-zero elements in Equation 5 among digital data of three sequential horizontal scan lines, (e.g., vertical and horizontal data (−U in FIG. 4) which have C component phases opposite to the phase of the central pixel (+U in FIG. 4) and diagonal data (+U in FIG. 4) which have C component phases the same as the phase of the central pixel (+U in FIG. 4)), are used for the convolution of Equation 3.

For the PAL system (in PAL mode), the horizontal/vertical coefficient mask ($h_{hv}(i,j)$) is represented by a 5×5 matrix as follows in equation 6:

$$h_{hv}(i,j) = \begin{bmatrix} Wu \cdot Wl & 0 & 0.5 \cdot Wu & 0 & Wu \cdot Wr \\ 0 & 0 & 0 & 0 & 0 \\ 0.5 \cdot Wl & 0 & N & 0 & 0.5 \cdot Wr \\ 0 & 0 & 0 & 0 & 0 \\ Wd \cdot Wl & 0 & 0.5 \cdot Wd & 0 & Wd \cdot Wr \end{bmatrix}$$ [Equation 6]

In Equation 6, N can be a normalizing value that ensures that the sum of the absolute value of N and the absolute values of the weight coefficients used for filtering is 1. The data window CVBS(i,j) used for the convolution represented by Equation 3, performed in the 2D BPF 330, corresponds to data of the 5×5 matrix of Equation 6. In particular, pixel data corresponding to non-zero elements in Equation 6 among digital data of three of every second horizontal scan line, (e.g., vertical and horizontal data items (−U in FIG. 5) which have C component phases opposite to the phase of the central pixel (+U in FIG. 5) and diagonal data (+U in FIG. 5) which have C component phases the same as the phase of the central pixel (+U in FIG. 5)), are used for the convolution of Equation 3.

From Equations 5 and 6, it can be seen that for the NTSC and PAL systems the same filter mask is used but the convolution is carried out using a different selection of data. Thus, in Equations 5 and 6, weights (coefficients) Wu, Wd, Wl and Wr are applied to the pixels (−U in FIGS. 4 and 5) having phases opposite to the phase of the central pixel (i,j) and each of the weights Wu, Wd, Wl and Wr have values of −0.5 to 0 varying (dynamically) according to local characteristics of an image. Accordingly, weights (coefficients) WuWl, WdWl, WuWr and WdWr applied to the diagonal pixels respectively have values of 0 to 0.25 varying (dynamically) according to the local characteristics of the image.

Specifically, coefficients Wu is applied to a pixel at the point (i−1,j) one horizontal scan line above the central pixel at (i,j) for the NTSC system (in NTSC mode), and to a pixel at the point (i−2,j) two horizontal scan lines above the central pixel at (i,j) for the PAL system (in PAL mode). Coefficient Wd is applied to a pixel at the point (i+1,j) one horizontal scan line under the central pixel at (i, j) for the NTSC system (in NTSC mode), and to a pixel at the point (i+2,j) two horizontal scan lines under the central pixel at (i,j) for the PAL system (in PAL mode). Furthermore, coefficient Wl is applied to a pixel at the point (i,j−2), located two pixels to the left of the central pixel at (i,j), for both of NTSC and PAL systems (in NTSC mode and in PAL mode) and coefficient Wr is applied to a pixel at the point (i,j+2), located two pixels to the right of the central pixel at (i,j), for both of NTSC and PAL systems (in NTSC mode and in PAL mode).

The first plurality of weight coefficients Wu, Wd, Wl and Wr used in Equations 5 and 6 are determined such that they satisfy Proportionality Condition 7.

$$|Wu| \propto \frac{1}{VARv} \text{(or } VARh) \text{ and } |Wu| \propto \frac{1}{VARu} \text{(or } VARd)$$ [Condition 7]

$$|Wd| \propto \frac{1}{VARv} \text{(or } VARh) \text{ and } |Wd| \propto \frac{1}{VARd} \text{(or } VARu)$$

$$|Wl| \propto \frac{1}{VARh} \text{(or } VARv) \text{ and } |Wl| \propto \frac{1}{VARl} \text{(or } VARr)$$

$$|Wr| \propto \frac{1}{VARh} \text{(or } VARv) \text{ and } |Wr| \propto \frac{1}{VARr} \text{(or } VARl)$$

where VARv denotes a vertical variation in the input video signal, VARh represents a horizontal variation in the input video signal, VARu represents an upward variation in the input video signal, VARd is a downward variation, VARl is a leftward variation, and VARr represents a rightward variation.

In an embodiment of the present invention, Proportionality Condition 7 is implemented by the following equation 8:

$$Wu = -0.5 \times \frac{Difh}{Difh + Difv} \times \frac{Difd}{Difu + Difd}$$ [Equation 8]

$$Wd = -0.5 \times \frac{Difh}{Difh + Difv} \times \frac{Difu}{Difu + Difd}$$

$$Wl = -0.5 \times \frac{Difv}{Difh + Difv} \times \frac{Difr}{Difr + Difl}$$

$$Wr = -0.5 \times \frac{Difv}{Difh + Difv} \times \frac{Difl}{Difr + Difl}$$

In Equation 8, Difv denotes the absolute value of a vertical difference, Difh represents the absolute value of a horizontal difference, Difu is the absolute value of an upward difference, Difd is the absolute value of a downward difference, Difl denotes the absolute value of a leftward difference and Difr represents the absolute value of a rightward difference.

FIGS. 6 and 7 are diagrams for explaining vertical and horizontal variations in pixels in the NTSC mode, respectively. Referring to FIG. 6, for example, Difu=du and Difd=dd and Difv=du+dd+dv. Referring to FIG. 7, Difh=dl+dr+dh, Difl=dl and Difr=dr. In both the NTSC and PAL modes, dl is the absolute value of the difference between the pixel data at (i,j) and the pixel data at (i,j−4), dr denotes the absolute value of the difference between the pixel data at (i,j) and the pixel data at (i,j+4), and dh represents the absolute value of the difference between the pixel data at (i,j−2) and the pixel data at (i,j+2). In NTSC mode, du denotes the absolute value of the difference between the pixel data at (i,j) and the pixel data at (i−2,j), dd represents the absolute value of the difference between the pixel data at (i,j) and the pixel data at (i+2,j), and dv is the absolute value of the difference between pixel data at (i−1,j) and the pixel data at (i+1,j). In PAL mode, du corresponds to the absolute value of the difference between the pixel data at (i,j) and the pixel data at (i−4,j), dd is the absolute value of the difference between the pixel data at (i,j) and the pixel data at (i+4,j), and dv corresponds to the absolute value of the difference between the pixel data at (i−2,j) and the pixel data at (i+2,j).

In Equation 8, the absolute value of the difference between pixel data having the same phase is used. These absolute values are calculated with reference to five continuous horizontal scan line data items for the NTSC system (in NTSC mode). For the PAL system (in PAL mode), the values of Equation 8 are determined with reference to data of five of every second horizontal scan line. Furthermore, various combinations of pixel data having the same phase can be used to represent horizontal/vertical/leftward/rightward variations.

Consequently, weight coefficient Wu is determined such that it is proportional to vertical and upward correlations with the central pixel; Wd is determined such that it is proportional to vertical and downward correlations with the central pixel; Wl is determined such that it is proportional to horizontal and leftward correlations with the central pixel; and Wr is determined such that it is proportional to horizontal and rightward correlations with the central pixel.

Figure 8A:
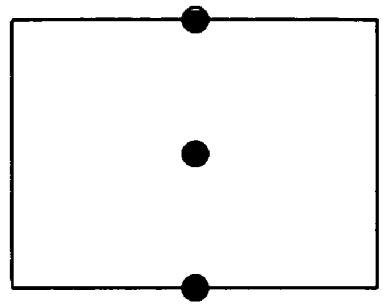
FIG. 8A is a diagram for explaining filtering when an edge in an image extends vertically.
Figure 8B:
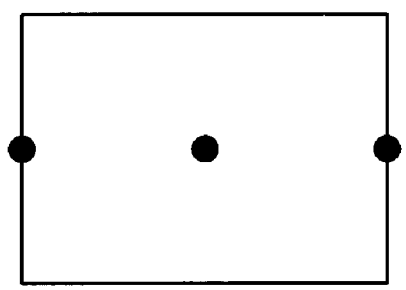
FIG. 8B is a diagram for explaining filtering when the edge in the image extends horizontally.
Figure 8C:
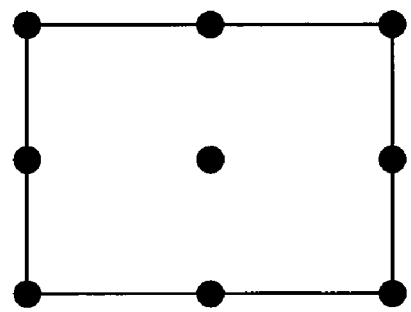
FIG. 8C is a diagram for explaining filtering in a general (no edge) case.

FIGS. 8A, 8B, and 8C are
comb filtering is carried out on pixels in the vertical direction, as illustrated in FIG. 8A

Figure 1:
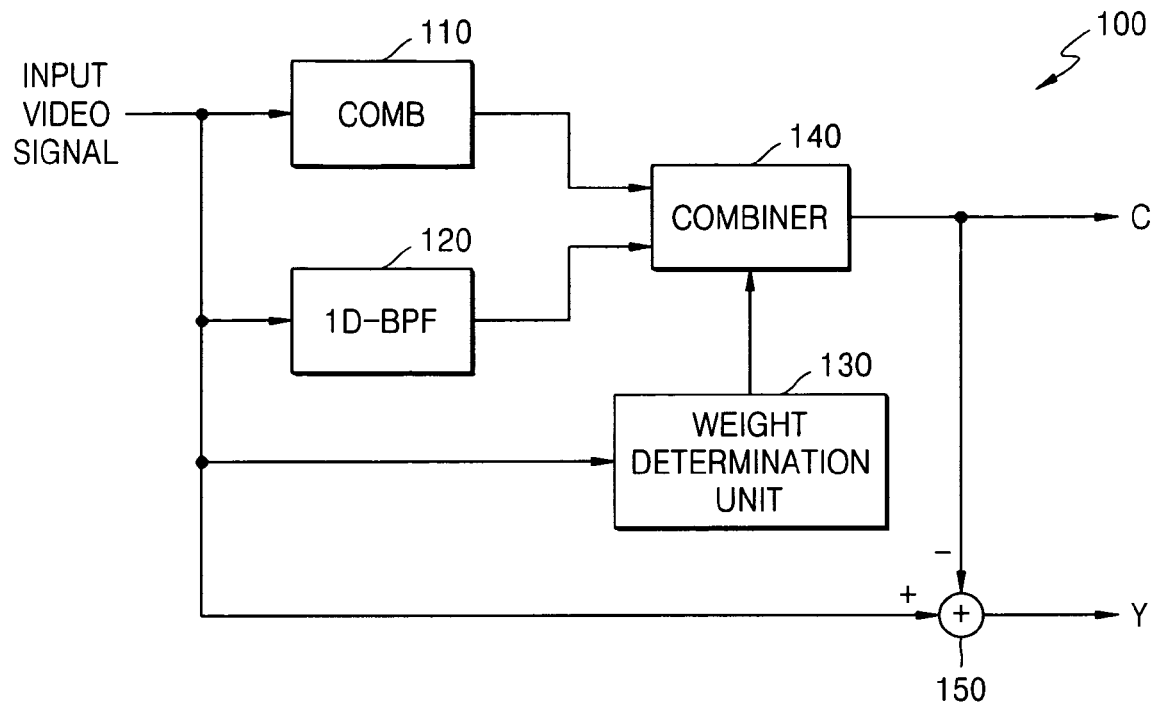
FIG. 1 is a block diagram of a conventional video signal processing apparatus.
Figure 2:
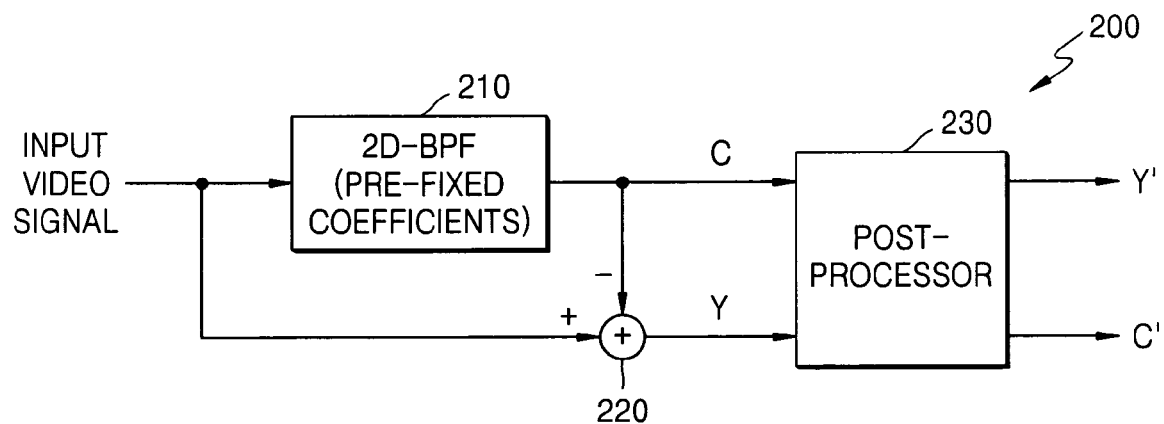
FIG. 2 is a block diagram of another conventional video signal processing apparatus.

1D bandpass filtering is performed on pixels in the horizontal direction, as illustrated in FIG. 8B 2D bandpass filtering is performed on pixels in the all directions, as illustrated in FIG. 8C The 2D BPF 330 carries out filtering by performing the convolution of Equation 3 using the first plurality of weight coefficients Wu, Wd, Wl and Wr, determined as above, to adaptively perform comb filtering, 1D bandpass filtering and 2D BPF filtering in a continuous manner in response to the local characteristics of the input video signal in both NTST and PAL modes. For example, when an edge in an image is determined to extend vertically, (e.g., when the local characteristics of the input video signal indicate high vertical correlation), Wr and Wl become small and |Wu| and |Wd| become large so that comb filtering is carried out on pixels in the vertical direction, as illustrated in FIG. 8A. When the edge is determined to extend horizontally, (e.g., when the local characteristics of the input video signal indicate high horizontal correlation), Wu and Wd become small and |Wl| and |Wr| become large so that 1D bandpass filtering is performed on pixels in the horizontal direction, as illustrated in FIG. 8B. In addition, when the local characteristics of the input video signal indicate high or low correlation in both the vertical and horizontal directions, all the coefficients Wu, Wd, Wl and Wr are significant such that 2D bandpass filtering is performed on pixels in the all directions, as illustrated in FIG. 8C.

Figure 9:
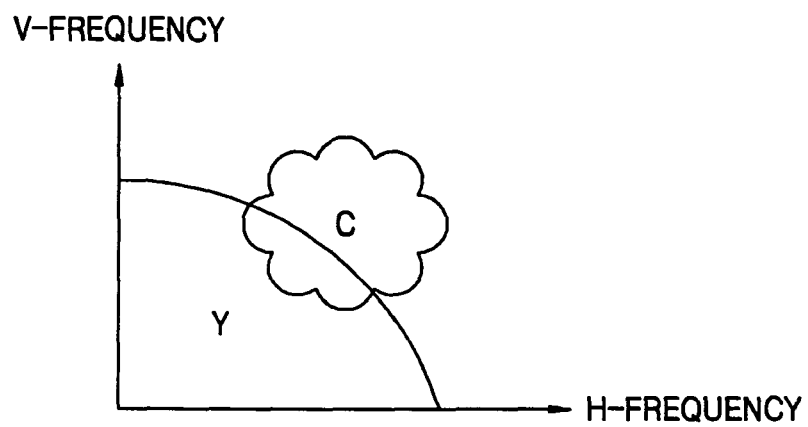
FIG. 9 shows spectrum characteristic for explaining C and Y components of a video signal.

FIG. 9 illustrates the output spectrum characteristics of the 2D BPF 330 when the correlation of the Y and C signals is low in both the horizontal and vertical directions. Referring to FIG. 9, for both horizontal (H) and vertical (V) frequencies, a C component can be included in the high frequency component of the separated Y signal or a Y component can be included in the high frequency component of the separated C signal. The high frequency component of the C signal included in the Y signal can cause dotted artifacts to appear on a display. Accordingly, a scheme of filtering the input video signal in a diagonal direction to remove the residual high frequency component of the Y signal from the C signal is proposed to improve the separation of the Y component and to minimize color artifacts of the C component.

Figure 10:
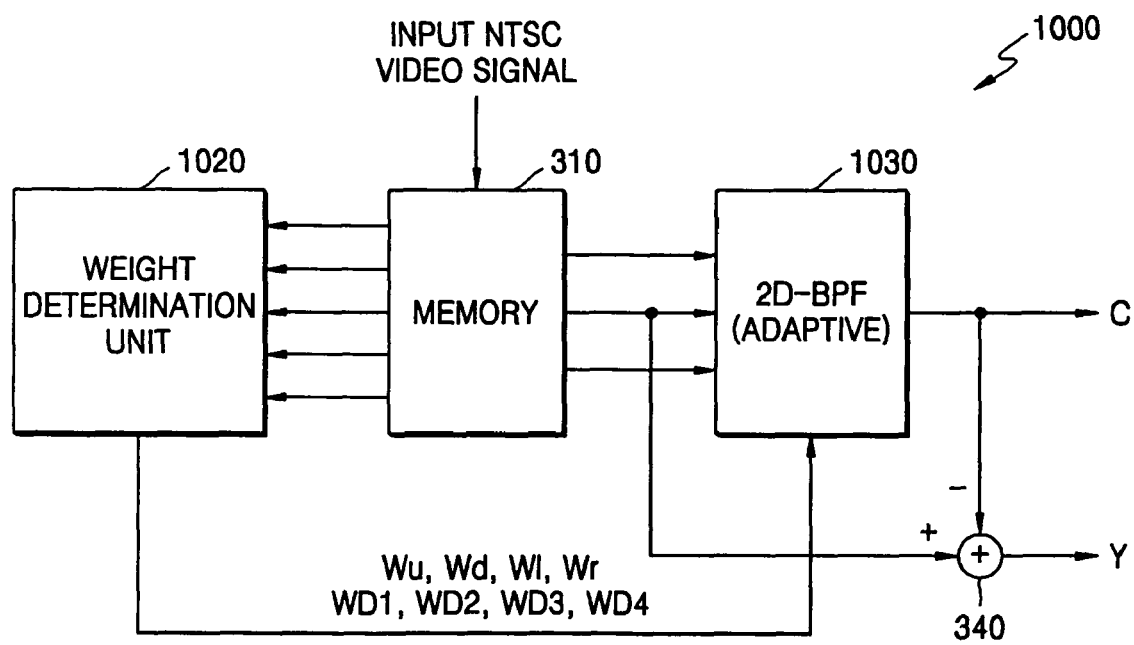
FIG. 10 is a block diagram of a video signal processing apparatus according to another embodiment of the present invention.

FIG. 10 is a block diagram of a video signal processing apparatus 1000 according to another embodiment of the present invention. Referring to FIG. 10, the video signal processing apparatus 1000 includes a memory (delay unit, or shift register) 310, a weight determination unit 1020, a 2D BPF 1030, and a subtracter 340. The operation of the video signal processing apparatus 1000 is similar to that of the video signal processing apparatus 300 of FIG. 3 and thus only distinctive parts 1020 and 1030 of the video signal processing apparatus 1000 are described below.

Preferably, the video signal processing apparatus 1000 is applied to composite signals in the NTSC system. In this case, the weight decision unit 1020 generates second plurality of weight coefficients WD1, WD2, WD3 and WD4 using a plurality of horizontal scan line data items input from the memory 310 (for instance, data for five horizontal lines) in addition to the first plurality of weight coefficients Wu, Wd, Wl and Wr.

The 2D BPF 1030 uses a horizontal/diagonal 2-dimensional coefficient mask composed of a combination of the second plurality of weight coefficients WD1, WD2, WD3 and WD4 together with the horizontal/vertical 2-dimensional coefficient mask composed of a combination of the first plurality of weight coefficients Wu, Wd, Wl and Wr represented by Equation 5. The horizontal/diagonal coefficient mask ($h_{hd}$(i,j)) is represented as follows in equation 9:

$$h_{hd}(i,j) = \begin{bmatrix} WD1 & 0 & 0 & 0 & 0 \\ 0 & 0 & N1 & 0 & 0 \\ 0 & 0 & 0 & 0 & WD2 \end{bmatrix} ** \begin{bmatrix} 0 & 0 & 0 & 0 & WD4 \\ 0 & 0 & N2 & 0 & 0 \\ WD3 & 0 & 0 & 0 & 0 \end{bmatrix}$$ [Equation 9]

In Equation 9, N1 can be a normalizing value that ensures that the sum of the absolute value of N1 and the absolute values of WD1 and WD2 is 1. Similarly, N2 can be a normalizing value that ensures that the sum of the absolute value of N2 and the absolute values of WD3 and WD4 is 1. WD1 and WD2 are weights respectively applied to the pixels at the points (i−1,j−4) and (i+1, j+4) (+U of FIG. 4), which have the same phase as the central pixel at (i,j), and have values of 0 to 0.5 varying (dynamically) according to local characteristics of the video signal. WD3 and WD4 are weights respectively applied to the pixels at the points (i+1,j−4) and (i−1,j+4) (+U of FIG. 4), which have the same phase as the central pixel at (i,j), and have values of 0 to 0.5 varying (dynamically) according to local characteristics of the video signal.

In an embodiment of the present invention, the second plurality of weight coefficients WD1, WD2, WD3 and WD4 are given by the following equation 10:

$$WD1 = 0.5 \times \frac{Difhv}{Difhv + DifD12} \times \frac{DifD1}{DifD1 + DifD2}$$ [Equation 10]

$$WD2 = 0.5 \times \frac{Difhv}{Difhv + DifD12} \times \frac{DifD2}{DifD1 + DifD2}$$

$$WD3 = 0.5 \times \frac{Difhv}{Difhv + DifD34} \times \frac{DifD3}{DifD3 + DifD4}$$

$$WD4 = -0.5 \times \frac{Difhv}{Difhv + DifD34} \times \frac{DifD4}{DifD3 + DifD4}$$

In Equation 10, Difhv is a combination of Difh and Difv and can be the sum of Difh and Difv; DifD1 is the absolute value of the difference between pixel data in a first diagonal direction, (e.g., the pixel data at (i,j) and pixel data at (i−1,j−2)); DifD2 is the absolute value of the difference between pixel data in a second diagonal direction, (e.g., the pixel data at (i,j) and pixel data at (i+1,j+2)); DifD3 is the absolute value of the difference between pixel data in a third diagonal direction, (e.g., the pixel data at (i,j) and the pixel data at (i+1,j−2)); DifD4 is the absolute value of the difference between pixel data in a fourth diagonal direction, (e.g., the pixel data at (i,j) and pixel data at (i−1,j+2)); DifD12 is a combination of DifDq and DifD2; and DifD34 is a combination of DifD3 and DifD4.

Here, the C signal (C(i,j)) output from the 2D BPF 1030 is represented as follows in equation 11:

$$C(i,j) = h_{hd}(i,j)  h_{hv}(i,j)  CVBS(i,j)$$ [Equation 11]

Thus, the 2D BPF 1030 convolves the horizontal/vertical coefficient mask $h_{hv}$(i,j), the horizontal/diagonal coefficient mask $h_{hd}$(i, j) and the corresponding data window CVBS(i,j) stored in the memory 310 to output (separate) the C signal of the input video signal. The Y signal (Y(i,j)) output from the subtracter 340 is represented as follows in equation 12:

$$Y(i,j) = CVBS(i,j) - C(i,j)$$ [Equation 12]

When there is no horizontal/vertical variation in a local region of an image (in the case of high correlation), a satisfactory result is obtained by filtering using Equation 3 and thus the values WD1, WD2, WD3 and WD4 in Equation 10 become small (or zero). However, when there is a large horizontal/vertical variation in the local region of the image (in the case of low correlation), the high frequency component of the Y signal can be included in the C component, as shown in FIG. 9, even after filtering using Equation 3. In this case, WD1, WD2, WD3 and WD4 become significant. Accordingly, the separation of the Y component is increased through sharp filtering represented by Equation 11, which reduces the diagonal pass band of the C component.

The scheme of filtering the input video signal in a diagonal direction to increase the separation of the Y component in PAL mode is different from the scheme used in NTSC mode.

FIGS. 11A and 11B show how diagonal variations in the chrominance signal phase are measured in PAL mode. Referring to FIGS. 11A and 11B, C components of neighboring pixels in diagonal directions have opposite phases. Specifically, when the phase of the central pixel is 0 or 180° (+U jor −U in FIG. 11A), the neighboring pixels with an opposite phase are located in the first diagonal direction as shown in FIG. 11A. When the phase of the central pixel is 90° or 270° (+v or −v in FIG. 11B), the neighboring pixels with an opposite phase are located in the second diagonal direction shown in FIG. 11B.

Figure 12:
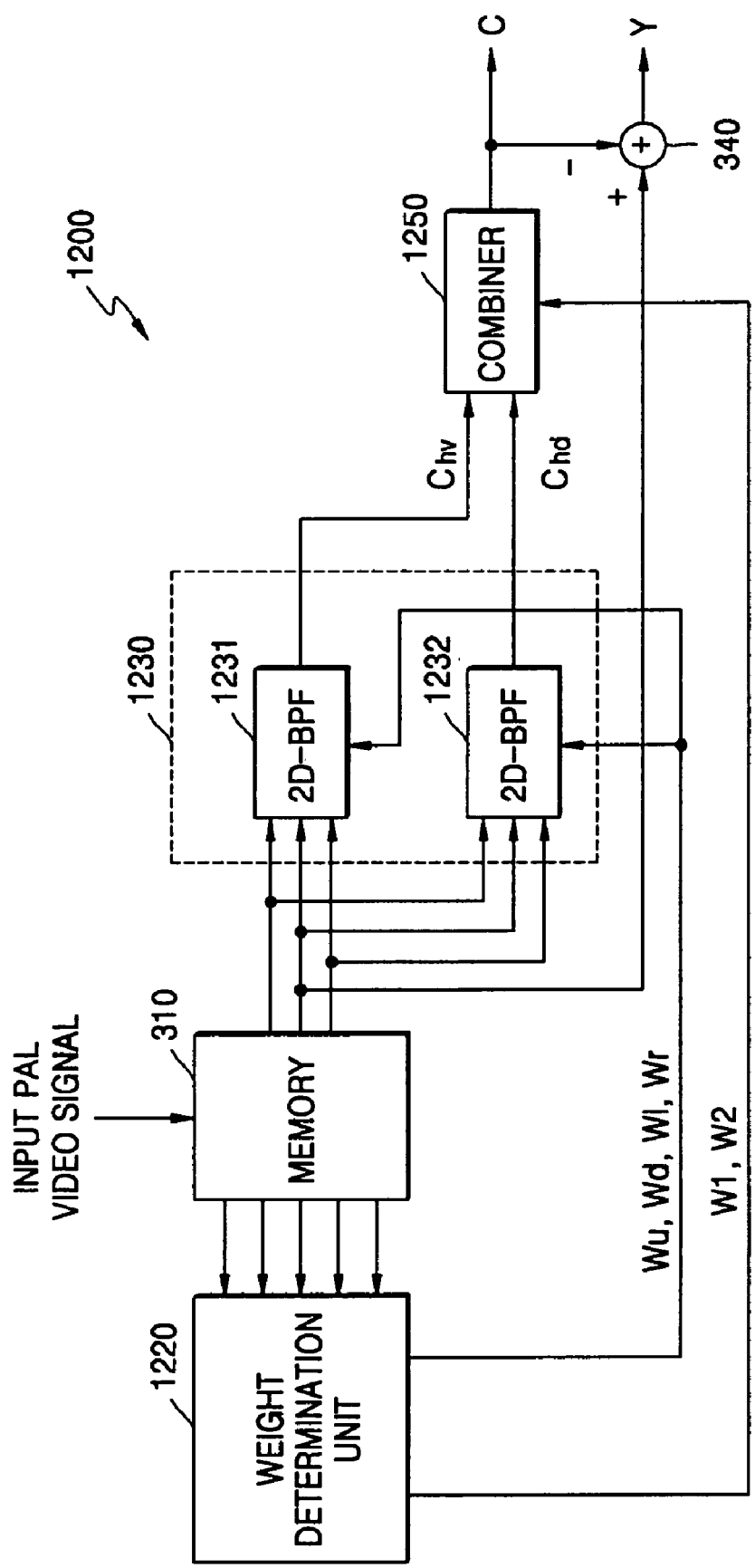
FIG. 12 is a block diagram of a video signal processing apparatus according to another embodiment of the present invention.

FIG. 12 is a block diagram of a video signal processing apparatus 1200 according to another embodiment of the present invention, optimized for PAL mode operation. Referring to FIG. 12, the video signal processing apparatus 1200 includes a memory 310, a weight determination unit 1220, a filter 1230, a combiner 1250, and a subtracter 340. The operation of the video signal processing apparatus 1200 is similar to that of the video signal processing apparatus illustrated in FIG. 3, and thus only distinctive parts 1220, 1230 and 1250 of the video signal processing apparatus 1200 are described below.

Preferably, the video signal processing apparatus 1200 is applied to composite signals in the PAL system (in PAL mode).

The filter 1230 includes a first 2D BPF 1231 and a second 2D BPF 1232. The operation of the first 2D BPF 1231 is identical to the operation of the 2D BPF 330 illustrated in FIG. 3. Thus, the first 2D BPF 1231 carries out the convolution of Equation 3 using the horizontal/vertical coefficient mask ($h_{hv}(i,j)$) composed of a combination of the first plurality of weight coefficients Wu, Wd, Wl, and Wr, to generate a first C signal ($C_{hv}(i,j)$). The second 2D BPF 1232 uses a horizontal/diagonal coefficient mask composed of horizontal/diagonal weight coefficients corresponding to combinations of the third plurality of weight coefficients Wu, Wd, Wl and Wr.

Here, the weight decision unit 1220 generates third plurality of weight coefficients Wu, Wd, Wl and Wr and a fourth plurality of weight coefficients W1 and W2 using a plurality of horizontal scan line data items input from the memory 310 (for instance, data for five of every second horizontal scan line), in addition to the first plurality of weight coefficients represented by Equation 8. The third plurality of weight coefficients Wu, Wd, Wl and Wr are calculated using the method of calculating the first plurality of weight coefficients Wu, Wd, Wl and Wr. However, the third plurality of weight coefficients Wu, Wd, Wl and Wr are calculated using different pixel data than the data used to calculate the first plurality of weight coefficients Wu, Wd, Wl and Wr.

The horizontal/diagonal coefficient mask of Equation 13 or Equation 14 is used according to whether the C component phase of the central pixel is 0/180° or 90°/270°. The horizontal/diagonal coefficient mask ($h_{hd}(i,j)$) of is represented by Equation 13 or 14.

$$h_{hd}(i, j) = \begin{bmatrix} Wu \cdot Wl & 0 & Wu & 0 & Wu \cdot Wr & 0 & 0 \\ 0 & Wl & 0 & N & 0 & Wr & 0 \\ 0 & 0 & Wd \cdot Wl & 0 & Wd & 0 & Wd \cdot Wr \end{bmatrix} \quad \text{[Equation 13]}$$

$$h_{hd}(i, j) = \begin{bmatrix} 0 & 0 & Wu \cdot Wl & 0 & Wu & 0 & Wu \cdot Wr \\ 0 & Wl & 0 & N & 0 & Wr & 0 \\ Wd \cdot Wl & 0 & Wd & 0 & Wd \cdot Wr & 0 & 0 \end{bmatrix} \quad \text{[Equation 14]}$$

The third plurality of weight coefficients Wu, Wd, Wl and Wr used in Equations 13 and 14 can be obtained using Equation 8 with reference to horizontal/diagonal pixel data items. In other words, the third plurality of weight coefficients Wu, Wd, Wl and Wr can be determined according to pixel data corresponding to non-zero elements in Equations 13 and 14. When five pixel data are used as shown in Equation 8, Wl and Wr can be determined with reference to five pixels including the central pixel and four pixels to the left and right of the central pixel. In addition, Wu and Wd can be determined with reference to five pixels including the central pixel and four pixels located diagonally around the central pixel corresponding to non-zero diagonal elements in Equations 13 and 14. Consequently, Wu is determined such that it is proportional to a correlation between the central pixel and pixels located diagonally from the central pixel and above the central pixel. Wd is determined such that it is proportional to a correlation between the central pixel and pixels located diagonally from the central pixel and below the central pixel. Wl is determined such that it is proportional to a correlation between the central pixel and pixels located horizontally from and to the left of the central pixel, and Wr is determined such that it is proportional to a correlation between the central pixel and pixels located horizontally from and to the right of the central pixel.

One of the horizontal/diagonal coefficient masks of Equation 13 or Equation 14 is selected and used based to whether the C component phase of the central pixel is 0/180° or 90°/270°. For example, the horizontal/diagonal coefficient mask of Equation 13 is used when the C component phase of the central pixel is 0 or 180° as shown in FIG. 11A; and when the C component phase of the central pixel is 90° or 270°, as shown in FIG. 11B, the horizontal/diagonal coefficient mask of Equation 14 is used. The data window corresponding to Equation 13 or Equation 14 includes horizontal/diagonal data having phases the same as and opposite to the phase of the central pixel from three neighboring horizontal scan lines of the input video signal.

Accordingly, the second 2D BPF 1232 carries out the convolution of Equation 15 on the horizontal/diagonal coefficient mask ($h_{hd}(i,j)$) of Equation 13 or Equation 14 and on the corresponding data window (CVBS(i,j)) stored in the memory 310 to generate a second C signal ($C_{hd}(i,j)$).

$$C_{hd}(i,j)=h_{hd}(i,j)**CVBS(i,j) \qquad \text{[Equation 15]}$$

The combiner 1250 combines the first C signal ($C_{hv}(i,j)$) generated by the first 2D BPF 1231 and the second C signal ($C_{hd}(i,j)$) generated by the second 2D BPF 1232 to output the final separated C signal of the input video signal. The combiner 1250 combines the first and second C signals ($C_{hv}(i,j)$ and $C_{hd}(i,j)$) using the fourth plurality of weight coefficients W1 and W2 as follows in equation 16:

$$C(i,j)=W1 \cdot C_{hv}(i,j)+W2 \cdot C_{hd}(i,j) \qquad \text{[Equation 16]}$$

In Equation 16, W1 is inversely proportional to the diagonal correlation with the central pixel and W2 is inversely proportional to the vertical correlation with the central pixel. W1 and W2 can have the form W1=A/(A+B) and W2=B/(A+B) using coefficients used in Equations 8 and 9. Here, A represents a diagonal variation and corresponds to Difv used in Equation 8 when it is obtained in a diagonal direction, and B represents a vertical variation and corresponds to a value proportional to Difv in Equation 8.

When the vertical variation is smaller than the diagonal variation, a relatively large weight is applied to the first C signal ($C_{hv}(i,j)$) which is based on the vertical/horizontal coefficient mask ($h_{hv}(i,j)$). On the other hand, when the diagonal variation is smaller than the vertical variation, a relatively large weight is applied to the second C signal ($C_{hd}(i,j)$) which is based on the vertical/diagonal coefficient mask ($h_{hd}(i,j)$). The first and second C signals ($C_{hv}(i,j)$ and $C_{hd}(i,j)$) are generated using only pixels having a high correlation with the currently processed central pixel. Accordingly, artifacts generated in the final separated C signal output from the combiner 1250 are minimized.

The subtracter 340 subtracts the final separated C signal output by the combiner 1250 from the currently processed input signal (CVBS(i,j)) to obtain the Y signal, which is represented as follows in equation 17:

$$Y(i,j)=CVBS(i,j)-C(i,j) \qquad \text{[Equation 17]}$$

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A video signal processing apparatus comprising:
a memory configured to store digital data corresponding to a plurality of horizontal scan lines of a composite input video signal;
a weight determination unit configured to generate a first plurality of weight coefficients using the digital data; and
a filter configured to generate a C signal of the input video signal by convolving a horizontal/vertical coefficient mask composed of the first plurality of weight coefficients with a corresponding data window of the digital data;
wherein the coefficient mask corresponds to the data window including data of pixels disposed vertically and horizontally from a central pixel, the data having C component phases opposite to the phase of the central pixel, and data of pixels disposed diagonally from the central pixel, the data having C component phases the same as the phase of the central pixel.

2. The apparatus of claim 1, wherein the filter carries out comb filtering when the local characteristics of the input video signal indicate high vertical correlation.

3. The apparatus of claim 2, wherein the filter carries out bandpass filtering when the local characteristics of the input video signal indicate high horizontal correlation.

4. The apparatus of claim 1, wherein the filter carries out 2D bandpass filtering when the local characteristics of the input video signal indicate high or low correlation in both the horizontal and vertical directions.

5. The apparatus of claim 1, wherein the composite input video signal is an NTSC composite signal.

6. The apparatus of claim 1, wherein the first plurality of weight coefficients include a first coefficient proportional to vertical and upward correlations with the central pixel, a second coefficient proportional to vertical and downward correlations with the central pixel, a third coefficient proportional to horizontal and leftward correlations with the central pixel, and a fourth coefficient proportional to horizontal and rightward correlations with the central pixel.

7. The apparatus of claim 1, wherein the weight determination unit further generates a second plurality of weight coefficients using the digital data, and the filter convolves the first C signal with a diagonal coefficient mask composed of the second plurality of weight coefficients and outputs the convolution result as the separated C signal of the input video signal.

8. The apparatus of claim 7, wherein the composite input video signal is a NTSC composite signal.

9. The apparatus of claim 7, wherein the second plurality of weight coefficients include a first coefficient proportional to a correlation between at least one pixel disposed in a first diagonal direction from a central pixel and the central pixel, a second coefficient proportional to a correlation between at least one pixel disposed in a second diagonal direction from the central pixel and the central pixel, a third coefficient proportional to a correlation between at least one pixel disposed in a third diagonal direction from the central pixel and the central pixel, and a fourth coefficient proportional to a correlation between at least one pixel disposed in a fourth diagonal direction from the central pixel and the central pixel.

10. A video signal processing apparatus comprising:
a memory configured to store digital data corresponding to a plurality of horizontal scan lines of a composite input video signal;
a weight determination unit configured to generate a first plurality of weight coefficients using the digital data; and
a filter configured to generate a C signal of the input video signal by convolving a horizontal/vertical coefficient mask composed of the first plurality of weight coefficients with a corresponding data window of digital data,
wherein the coefficient mask corresponds to the data window including data of pixels disposed vertically and horizontally from a central pixel, the data having C component phases opposite to the phase of the central pixel, and data of pixels disposed diagonally from the central pixel, the data having C component phases the same as the phase of the central pixel;
and wherein the pixels are disposed in every second line among a sequential plurality of horizontal scan lines of the input video signal, including the horizontal scan line containing the central pixel.

11. The apparatus of claim 10, wherein the composite input video signal is a PAL composite signal.

12. The apparatus of claim 10, wherein the first plurality of weight coefficients include a first coefficient proportional to vertical and upward correlations with the central pixel, a second coefficient proportional to vertical and downward correlations with the central pixel, a third coefficient proportional to horizontal and leftward correlations with the central pixel, and a fourth coefficient proportional to horizontal and rightward correlations with the central pixel.

13. The apparatus of claim 10, wherein the weight determination unit further generates second plurality of weight coefficients and third plurality of weight coefficients using the digital data, and the filter convolves a horizontal/diagonal coefficient mask composed of the second plurality of weight coefficients and a corresponding data window of the digital data to generate a second C signal.

14. The apparatus of claim 13, wherein the composite input video signal is a PAL composite signal.

15. The apparatus of claim 13, wherein the data window includes data of pixels disposed in a sequential plurality of the horizontal scan lines of the input video signal and having phases the same as and opposite to the phase of the central pixel, the pixels being separated from the central pixel according to whether the C component phase of the central pixel is 0°/180° or 90°/270°.

16. The apparatus of claim 13, wherein the second plurality of weight coefficients include a first coefficient proportional to diagonal and diagonally upward correlations with the central pixel, a second coefficient proportional to diagonal and diagonally downward correlations with the central pixel, a third coefficient proportional to horizontal and leftward correlations with the central pixel, and a fourth coefficient proportional to horizontal and rightward correlations with the central pixel, and the third plurality of weight coefficients include a first coefficient inversely proportional to a vertical correlation of the central pixel and a second coefficient inversely proportional to a diagonal correlation of the central pixel.

17. The apparatus of claim 13, further comprising a combiner configured to combine the first and second C signals weighted by the third plurality of weight coefficients and outputting the combined result as the separated C signal of the input video signal.

18. A video signal processing method comprising:
storing digital data corresponding to a plurality of horizontal scan lines of an input video signal;
generating first plurality of weight coefficients derived from the digital data; and
generating a C signal of the input video signal by convolving a horizontal/vertical coefficient mask composed of the first plurality of weight coefficients with a corresponding data window of the digital data,
wherein the coefficient mask corresponds to the data window including:
data of pixels disposed vertically and horizontally from a central pixel, the data having C component phases opposite to the phase of the central pixel;
and data of pixels disposed diagonally from the central pixel, the data having C component phases the same as the phase of the central pixel;
wherein the pixels are disposed in a sequential plurality of the horizontal scan lines of the input video signal.

19. The method of claim 18, wherein the input video signal is an NTSC signal.

20. The method of claim 18, wherein the first plurality of weight coefficients includes:

a first coefficient proportional to vertical and upward correlations with the central pixel;
a second coefficient proportional to vertical and downward correlations with the central pixel;
a third coefficient proportional to horizontal and leftward correlations with the central pixel; and
a fourth coefficient proportional to horizontal and rightward correlations with the central pixel.

21. The method of claim 18, further comprising:
generating second plurality of weight coefficients using the digital data; and
convolving the first C signal with a diagonal coefficient mask composed of the second plurality of weight coefficients and outputting the convolution result as the separated C signal of the input video signal.

22. The method of claim 21, wherein the input video signal is an NTSC signal.

23. The method of claim 21, wherein the second plurality of weight coefficients include: a first coefficient proportional to a correlation between the central pixel and at least one pixel disposed in a first diagonal direction from the central pixel; a second coefficient proportional to a correlation between the central pixel and at least one pixel disposed in a second diagonal direction from the central pixel and; a third coefficient proportional to a correlation between the central pixel and at least one pixel disposed in a third diagonal direction from the central pixel; and a fourth coefficient proportional to a correlation between the central pixel and at least one pixel disposed in a fourth diagonal direction from the central pixel.

24. A video signal processing method comprising:
storing digital data corresponding to a plurality of horizontal scan lines of an input video signal,
generating first plurality of weight coefficients derived from the digital data; and
generating a C signal of the input video signal by convolving horizontal/vertical coefficient mask composed of the first plurality of weight coefficients with a corresponding data window of the digital data,
wherein the coefficient mask corresponds to the data window including data of pixels disposed vertically and horizontally from a central pixel having C component phases opposite to the phase of the central pixel, and further including data of pixels disposed diagonally from the central pixel having C component phases the same as the phase of the central pixel; and
wherein the pixels are disposed in every second line among a sequential plurality of horizontal scan lines of the input video signal, including the horizontal scan line containing the central pixel.

25. The method of claim 24, wherein the input video signal is a PAL signal.

26. The method of claim 24, wherein the first plurality of weight coefficients include a first coefficient proportional to vertical and upward correlations with the central pixel, a second coefficient proportional to vertical and downward correlations with the central pixel, a third coefficient proportional to horizontal and leftward correlations with the central pixel, and a fourth coefficient proportional to horizontal and rightward correlations with the central pixel.

27. The method of claim 24, further comprising:
generating a second plurality of weight coefficients and third weight coefficients using the digital data; and
convolving a horizontal/diagonal coefficient mask composed of the second plurality of weight coefficients with a corresponding data window of the digital data to generate a second C signal.

28. The method of claim 27, wherein the video signal processing method is applied to a PAL signal.

29. The method of claim 27, wherein the data window corresponds to the horizontal/diagonal coefficient mask and includes data of pixels having phases the same as and opposite to the phase of the central pixel, the pixels being separated from the central pixel in the horizontal/diagonal directions according to whether the C component phase of the central pixel is 0°/180° or 90°/270°.

30. The method of claim 27, wherein
  the second plurality of weight coefficients include: a first coefficient proportional to diagonal and diagonally upward correlations with the central pixel; a second coefficient proportional to diagonal and diagonally downward correlations with the central pixel; a third coefficient proportional to horizontal and leftward correlations with the central pixel; and a fourth coefficient proportional to horizontal and rightward correlations with the central pixel, and wherein
  the third plurality of weight coefficients include: a first coefficient inversely proportional to a vertical correlation of the central pixel and a second coefficient inversely proportional to a diagonal correlation of the central pixel.

31. The method of claim 27, further comprising combining the first and second C signals according to the third plurality of weight coefficients and outputting the combined result as the separated C signal of the input video signal.

* * * * *